United States Patent [19]
Martinus et al.

[11] Patent Number: 5,806,907
[45] Date of Patent: Sep. 15, 1998

[54] QUICK RELEASE VEHICLE TAILGATE EXTENSION ASSEMBLY

[76] Inventors: Marlon Martinus, 2110 Pontiac Dr., Sylvan Lake, Mich. 48320; John Macbeth, 6347 Ellinwood, White Lake, Mich. 48383

[21] Appl. No.: 877,497

[22] Filed: Jun. 17, 1997

[51] Int. Cl.⁶ .............................. B62C 1/06; B62D 25/00
[52] U.S. Cl. .................... 296/26.11; 296/57.1; 296/59
[58] Field of Search ................... 296/26, 57.1, 59

[56] References Cited

U.S. PATENT DOCUMENTS

| | | |
|---|---|---|
| 1,289,997 | 12/1918 | Wyeth . |
| 2,046,175 | 6/1936 | Lim . |
| 2,284,419 | 5/1942 | Greig . |
| 2,867,471 | 1/1959 | Coon, Jr. . |
| 4,197,600 | 4/1980 | Slabic . |
| 4,472,639 | 9/1984 | Bianchi ..................................... 296/26 |
| 4,531,773 | 7/1985 | Smith ....................................... 296/26 |
| 4,778,213 | 10/1988 | Palmer ............... 296/57.1 X |
| 4,909,558 | 3/1990 | Roshinsky . |
| 5,154,470 | 10/1992 | Bringman, Jr. ................... 296/26 |
| 5,468,038 | 11/1995 | Sauri ....................................... 296/57.1 |
| 5,522,685 | 6/1996 | Lessard . |

*Primary Examiner*—Joseph D. Pape
*Attorney, Agent, or Firm*—Brooks & Kushman P.C.

[57] ABSTRACT

A quick release fold-up tailgate assembly for attachment to a vehicle having a cargo space defined by a bed, sidewalls, and a tailgate pivotable between open and closed positions with respect to the bed and sidewalls includes a back panel substantially coextensive with the inner surface of the tailgate and a pair of side panels which are pivotable with respect to the back panel on opposite sides of the back panel between a retracted position at which the side panels are parallel to the back panel to fold up the assembly and an extended position at which the side panels are engageable with the sidewalls to extend the cargo space when the tailgate is in its open position. Hinges pivotally attach the side panels to the back panel and the fold-up assembly to the inner surface of the tailgate. The hinges have a socket portion connected to the tailgate and a pin portion loosely insertable into the socket portion and quickly removable from the socket portion to release quickly the tailgate attachment from the vehicle.

7 Claims, 3 Drawing Sheets

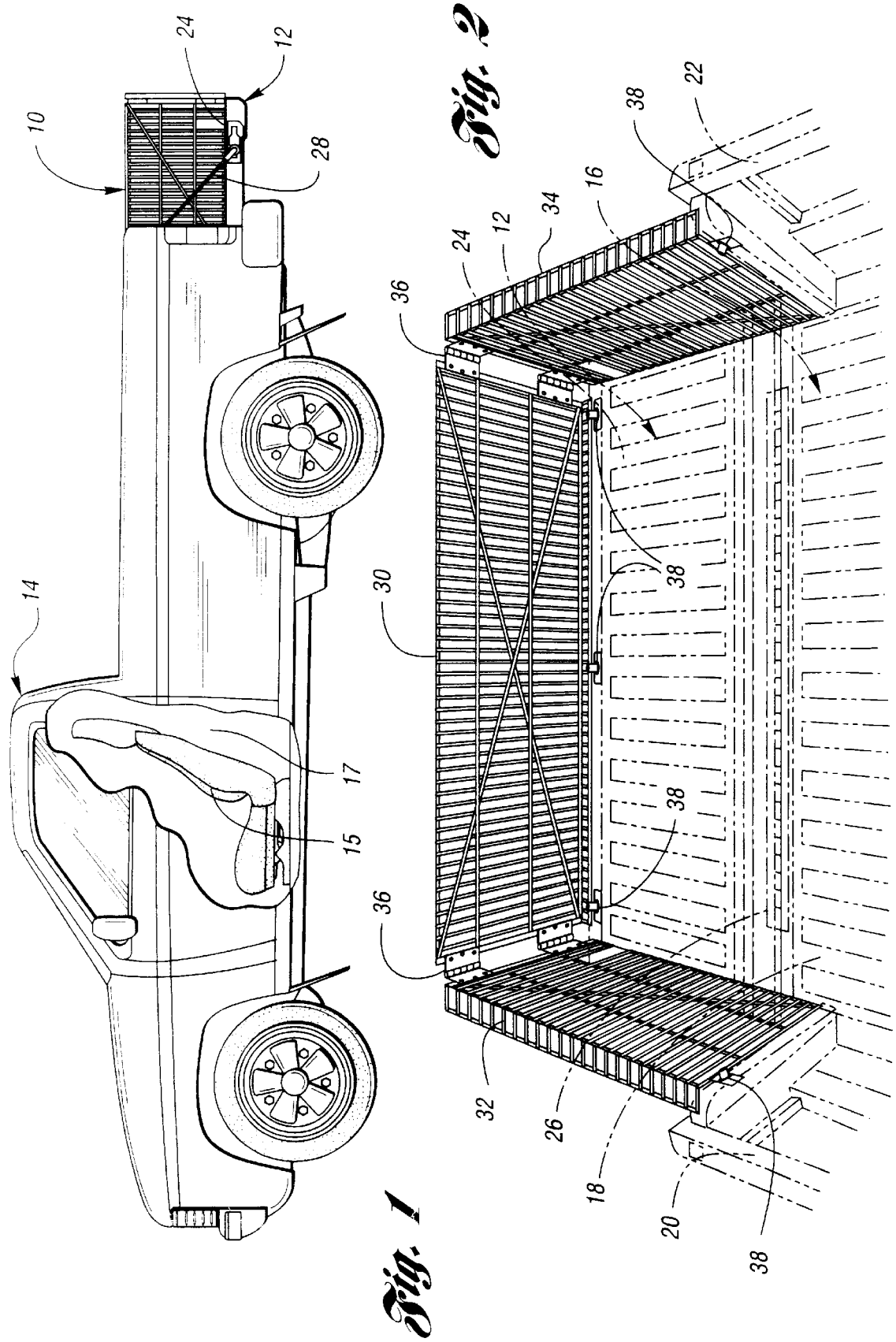

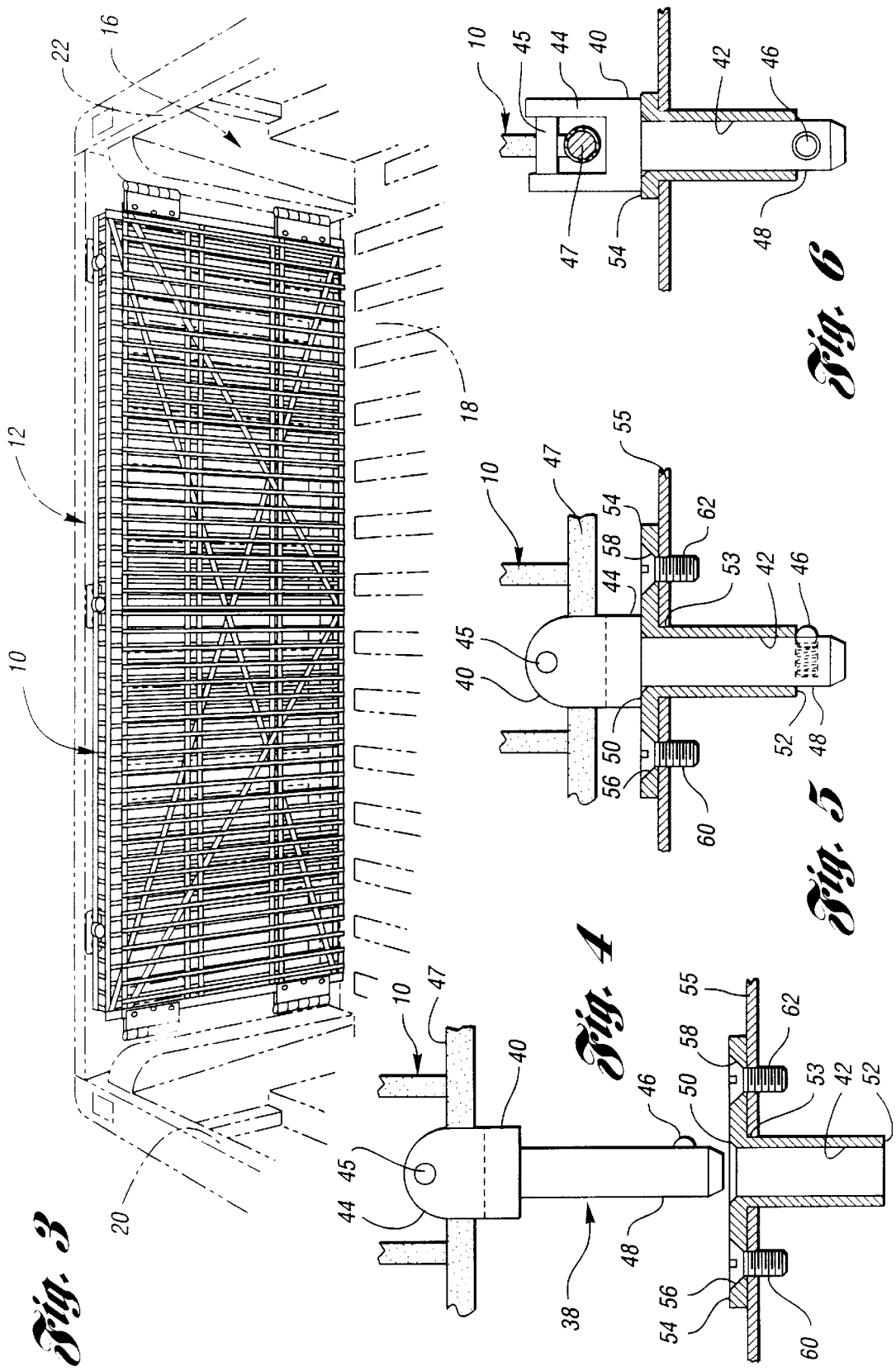

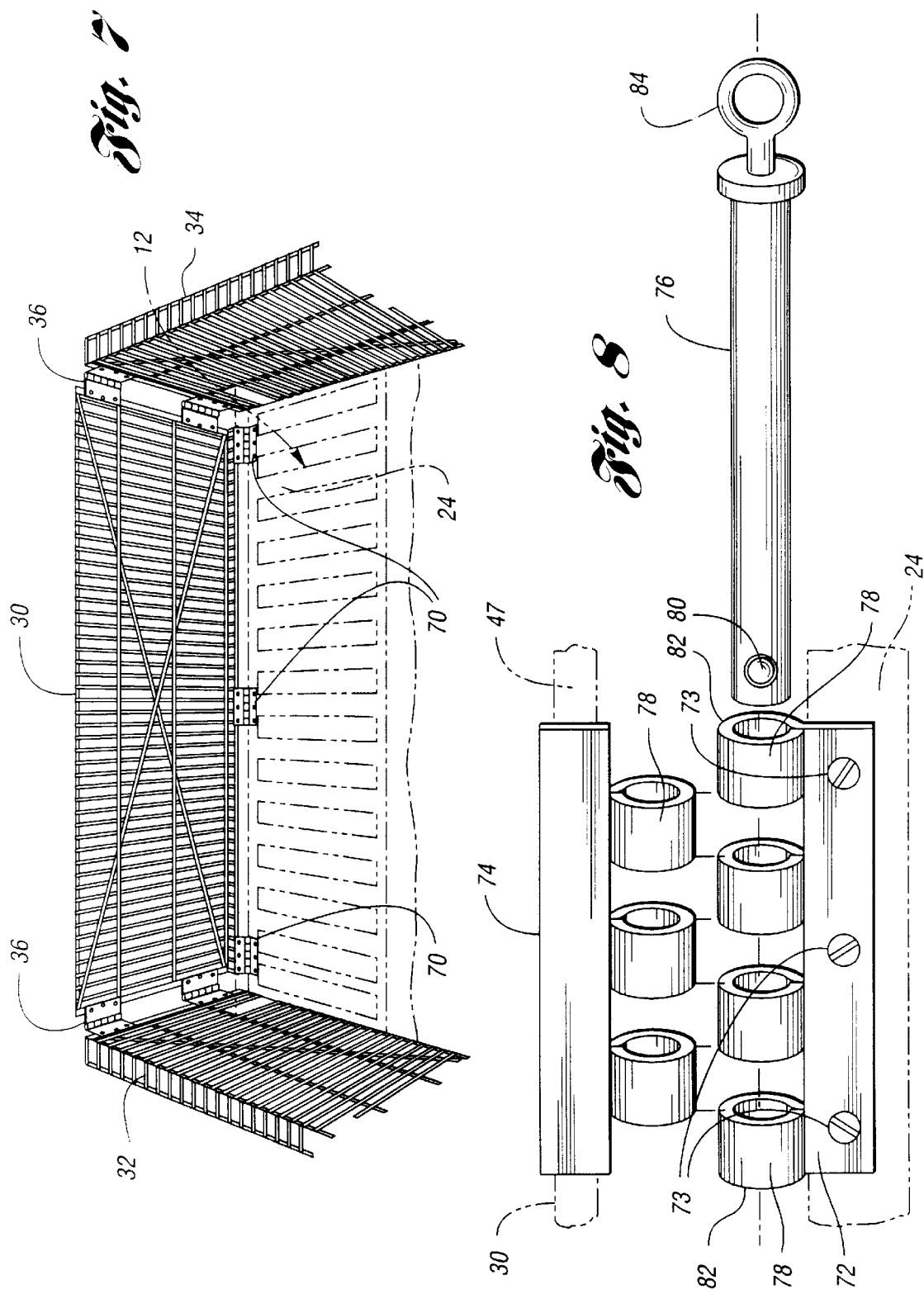

QUICK RELEASE VEHICLE TAILGATE EXTENSION ASSEMBLY

TECHNICAL FIELD

This invention relates to an assembly for extending the cargo space of a vehicle having a tailgate.

BACKGROUND ART

Many vehicles, such as pickup trucks and station wagons, have drop down tailgates to accommodate the transportation of cargo. Often to further increase cargo space and accommodate larger size loads, operators of such vehicles transport cargo with the tailgate in the down position. Unfortunately, transporting cargo with the tailgate down may be hazardous to other following vehicles and may jeopardize the cargo as well. To avoid such concerns tailgate extension assemblies have been disclosed such as those in U.S. Pat. No. 4,472,639 issued on Sep. 18, 1984 to Bianchi, U.S. Pat. No. 4,531,773 issued on Jul. 30, 1985 to Smith, U.S. Pat. No. 4,778,213 issued on Oct. 18, 1988 to Palmer, and U.S. Pat. No. 5,468,038 issued on Nov. 21, 1995 to Sauri. While these prior art assemblies have extended and enclosed the cargo area of a vehicle, they nevertheless have several shortcomings. Most importantly, these assemblies are heavy, bulky, costly, and cannot be quickly released from the tailgate for compact storage within the vehicle.

Accordingly, there is a need for a light weight tailgate extension assembly which may be quickly installed and removed from the tailgate of a vehicle. The attaching means of the assembly should facilitate installation of the assembly on more than one vehicle. Furthermore, the assembly should be designed such that it may be removed and stored within the passenger compartment of the vehicle.

SUMMARY OF THE INVENTION

The present invention is a quick release tailgate attachment for a vehicle having a cargo space defined by a bed, sidewalls, and a tailgate pivotable between open and closed positions with respect to the bed and sidewalls. The tailgate has an inner surface which faces the cargo space when the tailgate is in its closed position and which extends beyond the bed when the tailgate is in its open position. The attachment comprises a fold-up assembly and a plurality of hinge means. The fold-up assembly includes a back panel substantially coextensive with the inner surface and a pair of side panels. The pair of side panels are pivotable with respect to the back panel on opposite sides of the back panel between a retracted position at which the side panels are parallel to the back panel to fold up the assembly and an extended position at which the side panels are engageable with the sidewalls to extend the cargo space when the tailgate is in its open position. The plurality of hinge means pivotally attach the side panels to the back panel and the fold-up assembly to the inner surface of the tailgate. At least one of the plurality of hinge means comprises a first portion connected to the inner surface of the tailgate and forming a socket, and a second portion connected to the back panel and including a pin loosely insertable into the socket and quickly removable from the socket to release quickly the tailgate attachment from the vehicle.

Accordingly, an object of the present invention is to provide an improved tailgate extension assembly which is lightweight and compact and may be quickly installed and released from the tailgate of a vehicle.

Another object of the present invention is to provide a tailgate extension assembly which may be released from a vehicle and stored within the passenger compartment of the vehicle.

Another object of the present invention is a quick release tailgate attachment for a vehicle having a cargo space defined by a bed, sidewalls, and a tailgate pivotable between open and closed positions with respect to the bed and sidewalls, in which the tailgate has an inner surface which faces the cargo space when the tailgate is in its closed position and which extends beyond the bed when the tailgate is in its open position, and in which the attachment comprises a fold-up assembly including a back panel substantially coextensive with the inner surface and a pair of side panels pivotable with respect to the back panel on opposite sides of the back panel between a retracted position at which the side panels are parallel to the back panel to fold up the assembly and an extended position at which the side panels are engageable with the sidewalls to extend the cargo space when the tailgate is in its open position. The tailgate attachment has a plurality of hinge means for pivotally attaching the side panels to the back panel and the fold-up assembly to the inner surface of the tailgate. One of the hinge means comprises a first portion connected to the inner surface of the tailgate and forming a socket, and a second portion connected to the back panel. A pin connects the first and second portions when the fold-up assembly is attached to the tailgate and is loosely insertable into the socket and quickly removable from the socket to release quickly the tailgate attachment from the vehicle.

A more specific object of this invention is a quick release tailgate attachment for a vehicle having a cargo space defined by a bed, sidewalls, and a tailgate pivotable between open and closed positions with respect to the bed and sidewalls, in which the tailgate has an inner surface which faces the cargo space when the tailgate is in its closed position and which extends beyond the bed when the tailgate is in its open position, and in which the attachment comprises a fold-up assembly including a reticulated back panel substantially coextensive with the inner surface and a pair of side panels pivotable with respect to the back panel on opposite sides of the back panel between a retracted position at which the side panels are parallel to the back panel to fold up the assembly and an extended position at which the side panels are engageable with the sidewalls to extend the cargo space when the tailgate is in its open position. The tailgate attachment has a plurality of first hinge means for pivotally attaching the side panels to the back panel and a pin and socket for pivotally and quickly attaching and releasing the back panel with respect to the inner surface of the tailgate. The socket is insertable into the inner surface of the tailgate and the pin has a clevis end engageable with a reticulation of the back panel for attaching the pin to the back panel and a ball detent end insertable into the socket to quickly secure and release the pin from the socket so that the tailgate attachment may be released quickly from the vehicle.

The above objects and other objects, features, and advantages of the present invention will be readily apparent from the following detailed description of the best mode for carrying out the invention when taken in conjunction with the accompanying drawings.

BRIEF DESCRIPTION OF THE DRAWINGS

FIG. 1 is a side elevational view, partly cut away, of a vehicle equipped with a tailgate extension assembly in accordance with the present invention;

FIG. 2 is a perspective view in phantom of a portion of the vehicle of FIG. 1 with one embodiment of the tailgate extension assembly shown in an extended position;

FIG. 3 is a perspective view in phantom of a portion of the vehicle of FIG. 1 with the tailgate extension assembly shown in a retracted or fold-up position;

FIG. 4 is an exploded or released, front fragmentary cross-sectional view, partly in elevation, of a pin and a socket used as a hinged attaching means within the present invention;

FIG. 5 is a front fragmentary cross-sectional view, partly in elevation, of the pin and socket of FIG. 4 with the pin fully inserted in the socket in the attached position of the tailgate extension assembly;

FIG. 6 is a side fragmentary cross-sectional view, partly in elevation, of the pin and socket of FIG. 5;

FIG. 7 is a perspective view in phantom of a portion of the vehicle of FIG. 1 with another embodiment of the tailgate extension assembly shown in an extended position; and FIG. 8 is a fragmentary perspective view of the hinge means in the embodiment of FIG. 7.

DETAILED DESCRIPTION OF THE PREFERRED EMBODIMENTS

FIG. 1 shows a fold-up tailgate extension assembly 10 unfolded in accordance with the present invention and attached to a tailgate 12 of a vehicle 14. Vehicle 14 is depicted as a pick-up truck including a seat 15 with storage space 17 therebehind. One skilled in the art will recognize that a similar assembly 10 may be used with any type of vehicle which has a conventional drop-down tailgate, including a station wagon. In FIG. 1, tailgate extension assembly 10 is shown in the extended or open position at the tailgate 12 of vehicle 14.

FIG. 2 shows one embodiment of the invention. A cargo space 16 of vehicle 14 (shown in phantom) is defined by tailgate 12, a bed 18, and side walls 20 and 22. Tailgate 12 has an inner surface 24 which faces the cargo space 16 when the tailgate 12 is in a closed or up position. In the open or down position, tailgate 12 extends beyond the bed 18. In FIG. 2, tailgate 12 is shown in its open position. Tailgate 12 is attached to bed 18 through a conventional hinge at 26. Hinge 26 permits tailgate 12 to pivot between the closed position and the open position. Further, tailgate 12 is also attached to side walls 20 and 22 through a conventional linkage 28 (best shown in FIG. 1). Linkage 28 limits the drop of the tailgate 12 to a position at which inner surface 24 of tailgate 12 is horizontal thereby extending the bed 18 of vehicle 14.

Fold-up assembly 10 is comprised of a back panel 30 and side panels 32 and 34. To allow for free air flow through assembly 10 when assembly 10 is in the extended position, back panel 30 and side panels 32 and 34 may be formed of lightweight welded-up wire material in a reticulated or mesh-type design. One way to facilitate this design is to use pantry or closet shelving readily available at hardware or home improvement stores. One brand of shelving particularly useful in this invention is made in Sweden under the Trademark CLOSET MADE and distributed in the United States by CLARISON INTERNATIONAL of Ocala, Fla. Side panels 32 and 34 are attached to back panel 30 with hinges 36 by clamping or welding to the reticulations of the wire material. Hinges 36 allow side panels 32 and 34 respectively to pivot with respect to the back panel 30 between a retracted position in which side panels 32 and 34 are folded parallel to back panel 30 and the extended position in which side panels 32 and 34 are unfolded and engaged with sidewalls 20 and 22 of vehicle 14. Side panels 32 and 34 pivot so that assembly 10 may be stored in a retracted or folded position (FIG. 3) behind the driver's seat 15 in a compact space of storage space 17 as best shown in FIG. 1.

FIG. 4 shows a hinge means 38 including a pin 40 and a socket 42 for attaching the fold-up assembly to the tailgate or sidewalls of the vehicle. The design of this hinge means facilitates quick installation and release of assembly 10 to vehicle 14. Pin 40 includes a clevis end 44 (best shown in FIG. 6) which is adapted to receive an edge portion 47 or reticulation of fold-up assembly 10. A retainer pin 45 is inserted from one side of clevis end 44 to the opposite side of clevis end 44 to attach pin 40 to fold-up assembly 10. This clevis end design allows pin 40 to pivot with respect to the panel 30, 32, or 34 to which it is attached. Further, pin 40 includes a spring-loaded ball detent 46 located at a second end 48 of pin 40, opposite the clevis end 44. Socket 42 is adapted to loosely receive pin 40. As pin 40 is inserted into socket 42, ball detent 46 is compressed or cammed inwardly by a first end 50 of socket 42. When pin 40 is fully inserted into socket 42 as shown in FIG. 5, ball detent 46 is positioned beyond a second end 52 of socket 42. As ball detent 46 moves beyond the second end 52 of socket 42, the spring-loaded ball detent 46 is biased outwardly selectively retaining pin 40 within socket 42.

As shown in FIGS. 4 and 5, socket 42 includes a plate or flange 54. A hole 53 sized to receive socket 42 may be drilled at the appropriate location in the sheet metal 55 of vehicle 14. Plate 54 includes countersunk holes 56 and 58 adapted to receive screws 60 and 62 which secure socket 42 to vehicle 14. One skilled in the art will recognize that other fastening means may be used to attach socket 42 to vehicle 14. The above described attaching means 38 may be used to attach back panel 30 to the inner surface 24 of tailgate 12 and to attach side panels 32 and 34 to side walls 20 and 22.

FIGS. 7 and 8 show a second embodiment of this invention. In this embodiment hinge means 70 is a butt hinge which has one hinge portion 72 connected to the inner surface of the tailgate 24 with screws 73 or the like and the other hinge portion 74 connected to the back panel 30 of the fold-up assembly 10 by attachment as by welding to the reticulation 47 at the edge of the panel. The pin or pintle 76 is selected to loosely interfit with socket portions 78 of hinge 70 whereby to be easily and quickly removed so that the fold-up assembly 10 can be easily and quickly released from vehicle 14. To keep pin 76 from jiggling out of the socket portions 78, the pin has a spring loaded ball detent 80 like the ball detent 46 in the embodiment of FIG. 5. Ball detent 80 is compressed or cammed inwardly by the opposite ends 82 of the hinge socket portions 78 when pin 76 is removed or inserted. A ring 84 may be included on one end of pin 76 as an aid in removing the pin.

When not in use, fold-up assembly 10 may be quickly released and removed from vehicle 14 or compactly folded against tailgate 12. Assembly 10 may be compactly folded, as shown in FIG. 3, against tailgate 12 by decoupling the attaching means 38 which attach side panels 32 and 34 to side walls 20 and 22, pivoting side panels 32 and 34 inward to a position parallel and adjacent to back panel 30, and pivoting back panel 30 and side panels 32 and 34 to a position parallel and adjacent to tailgate 12. Assembly 10 may also be quickly released from the tailgate and removed from vehicle 14 by decoupling the attaching means 38 which attach back panel 30 to tailgate 12 and side panels 32 and 34 to side walls 20 and 22. Once removed from vehicle 14, assembly 10 may be compactly folded and stored within the passenger compartment, such as behind the driver's seat 15 in the compartment 17. The reticulated design makes the folded-up assembly lightweight as well as compact so that the assembly can be easily manually moved.

One skilled in the art will recognize that fold-up assembly 10 will normally remain in a folded position when tailgate 12 is closed. However, to prohibit assembly 10 from moving when vehicle 14 is driven, a latch (not shown) may also be used to secure assembly 10 to tailgate 12 in the folded or fold-up position.

It is to be understood, of course, that while the forms of the invention described above constitute the best modes contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

We claim:

1. A quick release tailgate attachment for a vehicle having a cargo space defined by a bed, sidewalls, and a tailgate pivotable between open and closed positions with respect to said bed and sidewalls, the tailgate having an inner surface which faces the cargo space when the tailgate is in its closed position and which extends beyond the bed when the tailgate is in its open position, the attachment comprising:

a fold-up assembly including a back panel substantially coextensive with said inner surface and a pair of side panels pivotable with respect to said back panel on opposite sides of said back panel between a retracted position at which said side panels are parallel to said back panel to fold up said assembly and an extended position at which said side panels are engageable with said sidewalls to extend the cargo space when said tailgate is in its open position; and a plurality of hinge means for pivotally attaching said side panels to said back panel and said fold-up assembly to said inner surface of said tailgate;

at least one of said plurality of hinge means comprising a first portion connected to said inner surface of said tailgate and forming a socket, a second portion connected to said back panel, and a pin connecting said first and second portions when said fold-up assembly is attached to said tailgate, said pin being loosely insertable into said socket and quickly removable from said socket to release quickly the tailgate attachment from the vehicle.

2. The quick release tailgate attachment of claim 1 wherein said panels of said fold-up assembly are reticulated shelving and said second portion of said hinge means is connected to said back panel by welding to a reticulation of said reticulated shelving.

3. The quick release tailgate attachment of claim 1 wherein the vehicle is a pick-up truck having a compact space behind a seat, and the fold-up assembly when the pair of side panels is in its retracted position is sufficiently compact and lightweight to be manually stored in said compact space.

4. A quick release tailgate attachment for a vehicle having a cargo space defined by a bed, sidewalls, and a tailgate pivotable between open and closed positions with respect to said bed and sidewalls, the tailgate having an inner surface which faces the cargo space when the tailgate is in its closed position and which extends beyond the bed when the tailgate is in its open position, the attachment comprising:

a fold-up assembly including a back panel substantially coextensive with said inner surface and a pair of side panels pivotable with respect to said back panel on opposite sides of said back panel between a retracted position at which said side panels are parallel to said back panel to fold up said assembly and an extended position at which said side panels are engageable with said sidewalls to extend the cargo space when said tailgate is in its open position; and a plurality of butt hinge means for pivotally attaching said side panels to said back panel and said fold-up assembly to said inner surface of said tailgate;

at least one of said plurality of butt hinge means comprising a first hinge portion connected to said inner surface of said tailgate and a second hinge portion connected to said back panel;

said first and second hinge portions having socket portions; and a pin loosely fittable into said socket portions and quickly removable therefrom to release quickly the tailgate attachment from the vehicle.

5. A quick release tailgate attachment for a vehicle having a cargo space defined by a bed, sidewalls, and a tailgate pivotable between open and closed positions with respect to said bed and sidewalls, the tailgate having an inner surface which faces the cargo space when the tailgate is in its closed position and which extends beyond the bed when the tailgate is in its open position, the attachment comprising:

a fold-up assembly including a reticulated back panel substantially coextensive with said inner surface and a pair of side panels pivotable with respect to said back panel on opposite sides of said back panel between a retracted position at which said side panels are parallel to said back panel to fold up said assembly and an extended position at which said side panels are engageable with said sidewalls to extend the cargo space when said tailgate is in its open position;

a plurality of first hinge means for pivotally attaching said side panels to said back panel; and at least one second hinge means including a pin and socket for pivotally and quickly attaching and releasing said back panel with respect to said inner surface of said tailgate;

said socket being insertable into said inner surface of said tailgate;

said pin having a clevis end engageable with a reticulation of said back panel for attaching said pin to said back panel and a ball detent end insertable into said socket to quickly secure and release said pin from said socket so that the tailgate attachment may be released quickly from the vehicle.

6. The quick release tail gate attachment of claim 5 wherein the side panels of said fold-up assembly are reticulated and another of said second hinge means includes a second pin and second socket for quickly attaching and releasing at least one of said side panels to at least one of said sidewalls, said second socket being insertable into said at least one of said sidewalls; and said second pin having a clevis end engageable with a reticulation of said side panel for attaching said second pin to its side panel and a second ball detent end insertable into said second socket to quickly secure and release said second pin from said second socket so that the tailgate attachment may further be released quickly from the vehicle.

7. The quick release tailgate attachment of claim 5 wherein said ball detent end includes a pocket for the ball and a spring for biasing said ball outwardly from said pocket.

* * * * *